United States Patent
Kight

(10) Patent No.: US 9,435,205 B2
(45) Date of Patent: *Sep. 6, 2016

(54) APPARATUS FOR BROACHING REPAIR OF TURBINE ROTOR STEEPLES

(71) Applicant: General Electric Technology Gmbh, Baden (CH)

(72) Inventor: Matthew S. Kight, Norfolk, VA (US)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/748,304

(22) Filed: Jun. 24, 2015

(65) Prior Publication Data

US 2015/0292329 A1    Oct. 15, 2015

Related U.S. Application Data

(62) Division of application No. 14/147,955, filed on Jan. 6, 2014, now Pat. No. 9,108,256, which is a division of application No. 12/540,836, filed on Aug. 13, 2009, now Pat. No. 8,640,335.

(51) Int. Cl.
| | |
|---|---|
| *B23D 43/02* | (2006.01) |
| *F01D 5/00* | (2006.01) |
| *B23D 37/22* | (2006.01) |
| *B23P 6/00* | (2006.01) |
| *F01D 5/12* | (2006.01) |
| *B23D 43/06* | (2006.01) |

(52) U.S. Cl.
CPC .............. *F01D 5/005* (2013.01); *B23D 37/22* (2013.01); *B23D 43/02* (2013.01); *B23P 6/002* (2013.01); *F01D 5/12* (2013.01); *B23D 2043/025* (2013.01); *B23D 2043/063* (2013.01); *F05D 2220/30* (2013.01); *F05D 2230/10* (2013.01); *Y10T 29/4932* (2015.01); *Y10T 29/49318* (2015.01); *Y10T 29/49321* (2015.01); *Y10T 29/49996* (2015.01); *Y10T 29/5176* (2015.01); *Y10T 407/16* (2015.01); *Y10T 407/1628* (2015.01); *Y10T 409/400175* (2015.01); *Y10T 409/403325* (2015.01); *Y10T 409/406475* (2015.01)

(58) Field of Classification Search
CPC ......... F01D 5/005; F01D 5/12; B23D 43/02; B23D 2043/025; F05D 2220/30; F05D 2230/10

See application file for complete search history.

(56) References Cited

U.S. PATENT DOCUMENTS

| | | | |
|---|---|---|---|
| 2,123,777 A * | 7/1938 | Hart ...................... | B23D 43/06 29/566 |
| 4,091,714 A | 5/1978 | Kostousov et al. | |
| 4,537,538 A | 8/1985 | Mitamura et al. | |
| 6,676,336 B2 * | 1/2004 | Nolan .................... | B23D 37/22 407/13 |
| 6,767,168 B2 | 7/2004 | Miller | |
| 2003/0091399 A1 | 5/2003 | Nolan et al. | |

OTHER PUBLICATIONS

PCT International Search Report and Written Opinion of the International Searching Authority, dated Sep. 23, 2010—(PCT/US2010/044353).

* cited by examiner

*Primary Examiner* — Richard Chang
(74) *Attorney, Agent, or Firm* — Buchanan Ingersoll & Rooney PC

(57) ABSTRACT

A broaching apparatus includes; a broach having a cross-section corresponding to a geometry of slot between adjacent steeples of a turbine rotor, and a mechanism which moves the broach through the slot in a direction substantially parallel to a direction of extension of the slot.

2 Claims, 6 Drawing Sheets

APPARATUS FOR BROACHING REPAIR OF TURBINE ROTOR STEEPLES

TECHNICAL FIELD

This application relates generally to an apparatus and method for repairing steam turbine rotor steeples, and more particularly, to a broaching apparatus and method of operating the same which leverages an existing rotor steeple geometry to accurately guide the broaching apparatus through a repair path.

BACKGROUND

Commercial turbine rotors typically include a plurality of axial blade attachments for receiving butt-ends of turbine blades. The axial blade attachments may include a plurality of steeples, each steeple having a series of grooves and hooks, thereby forming a "Christmas tree" or "fir tree" shape. The geometry of the steeples ensures a close mechanical linkage with the butt-ends of the turbine blades.

Over time, the turbine rotor steeples are subject to corrosion fatigue cracking. The cracks may prevent the proper operation of the turbine rotor. The cracking can be readily detected with several non-destructive testing ("NDT") technologies. The NDT technologies include phased array ultrasonic and standard ultrasonic testing, which may be applied while the butt-end of the turbine blade is still attached to the rotor steeples, as well as eddy current, dye penetrant, and magnetic particle detection methods, which may be applied while the butt-end of the turbine blade is removed from the rotor steeples.

However, methods for removing the cracks have not kept pace with the improvements made in crack detection. Currently, detected cracks are ground out by hand, with a die grinder tool, or milled out with a milling machine to remove the cracked material down to a predetermined repair radius. Removal of the cracks by hand grinding and/or milling operations can be very tedious and time consuming. The time consuming repair process results in increased outage time for the turbine rotor, with an appreciable financial loss to the turbine operator, and decreased unit availability. Hand grinding and/or milling to remove the cracked material may result in a rough surface finish and various repair sites may have substantially different repair radii.

What is needed is an apparatus and method for more quickly removing the cracks in the turbine rotor steeples while at the same time maintaining or improving the quality control of the repair procedure.

SUMMARY

This invention provides a method to substantially reduce steeple repair time, and improve repair quality, through the use of a field deployable steeple-broaching device. Use of this device may result in reduced turbine outage time, and increased turbine availability, with an appreciable financial benefit to the customer. Because the relief radius is cut with a precise tool, its surface finish and uniformity are far better controlled than performing the repair by hand.

According to the aspects illustrated herein, there is provided a broaching apparatus, the apparatus including; a broach having a cross-section corresponding to a geometry of a steeple of a turbine rotor, and a mechanism which moves the broach through a slot between adjacent steeples in a direction substantially parallel to a direction of extension of the slot.

According to other aspects illustrated herein, an exemplary embodiment of a method for repairing a crack in a steeple of a turbine rotor includes; disposing a broach having a cross-section corresponding to a geometry of a steeple of the turbine rotor in a slot between adjacent steeples of the turbine rotor, and removing material surrounding the crack by moving the broach through the slot in a direction substantially parallel to a direction of extension of the slot.

The above described and other features are exemplified by the following figures and detailed description.

BRIEF DESCRIPTION OF THE DRAWINGS

Referring now to the figures, which are exemplary embodiments, and wherein the like elements are numbered alike.

DETAILED DESCRIPTION

Disclosed herein are an apparatus for repairing a crack in a blade attachment of a turbine rotor and a method of operating the same, and more particularly, to a broaching apparatus and method of operating the same which leverages an existing rotor steeple geometry to accurately guide the broaching apparatus through a repair path.

Figure 1:
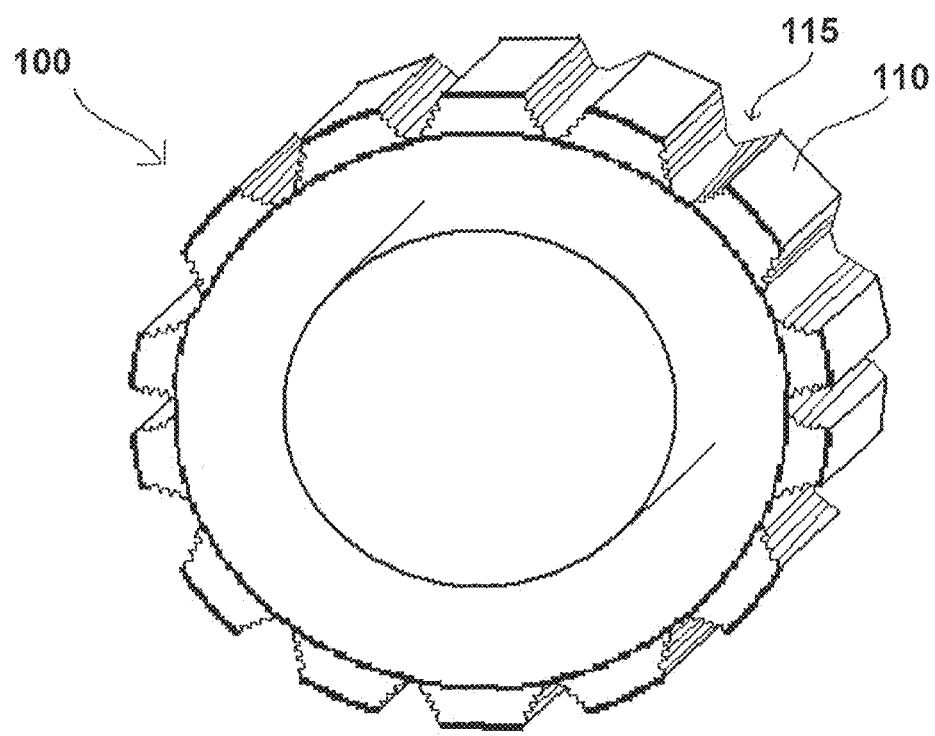
FIG. 1 is a front perspective view of a turbine rotor including a plurality of steeples according to an exemplary embodiment of the present invention.
Figure 2A:
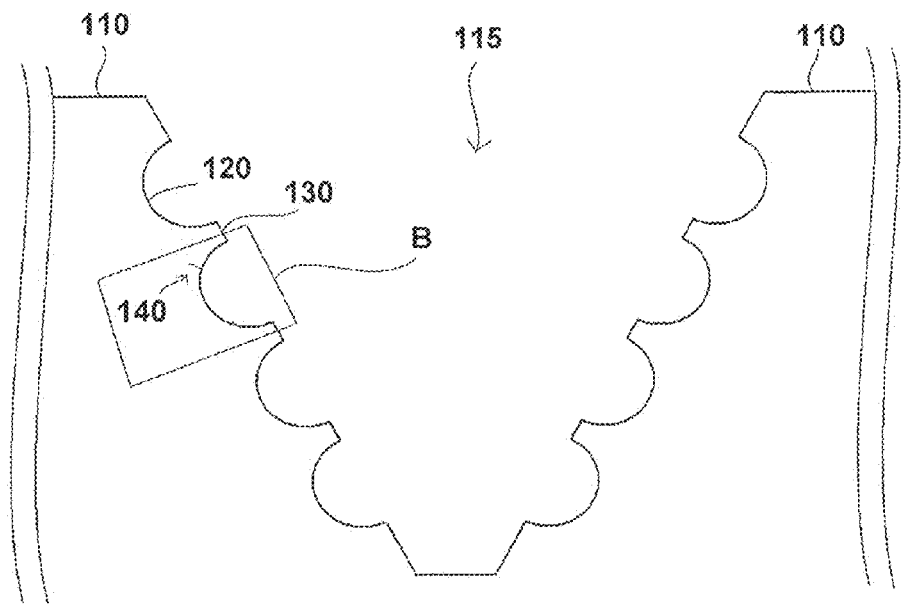
FIG. 2A is a partial cross-sectional view of the turbine rotor of FIG. 1.

FIG. 1 is a front perspective view of a turbine rotor including a plurality of steeples according to an exemplary embodiment of the present invention. FIG. 2A is a partial cross-sectional view of the turbine rotor of FIG. 1, FIG. 2B is an enlarged view of an area B in FIG. 2A illustrating a crack in a steeple of the turbine rotor and FIG. 2C is an enlarged view of the area B in FIG. 2A illustrating a repair solution in the steeple of the turbine rotor.

Referring to FIG. 1, a turbine rotor 100 includes a plurality of axial entry blade attachments, referred to as steeples 110. The turbine rotor 100 of FIG. 1 includes straight axial entry blade attachments, but the turbine rotor 100 may have various other types of axial entry blade attachments, such as angled and curved. The steeples 110 are configured to receive a turbine blade (not shown) in a slot 115 between adjacent steeples 110. The turbine blade may be removed prior to performing a repair operation.

Figure 2B:
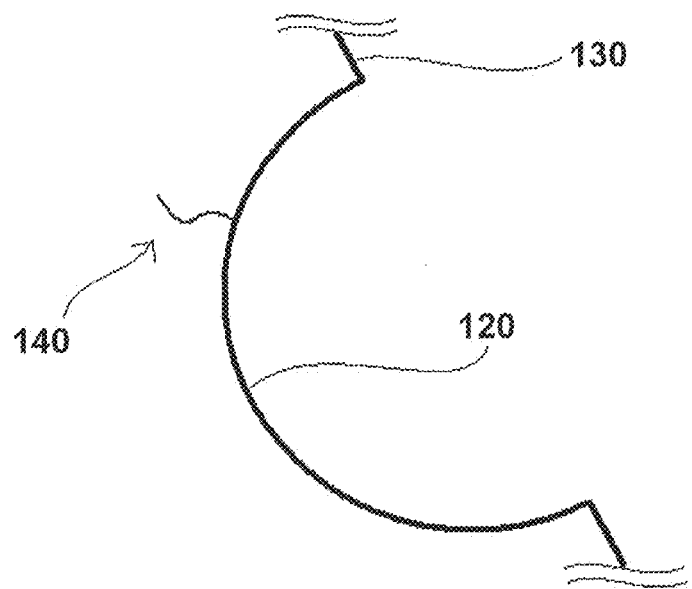
FIG. 2B is an enlarged view of an area B in FIG. 2A illustrating a crack in a steeple of the turbine rotor.
Figure 2C:
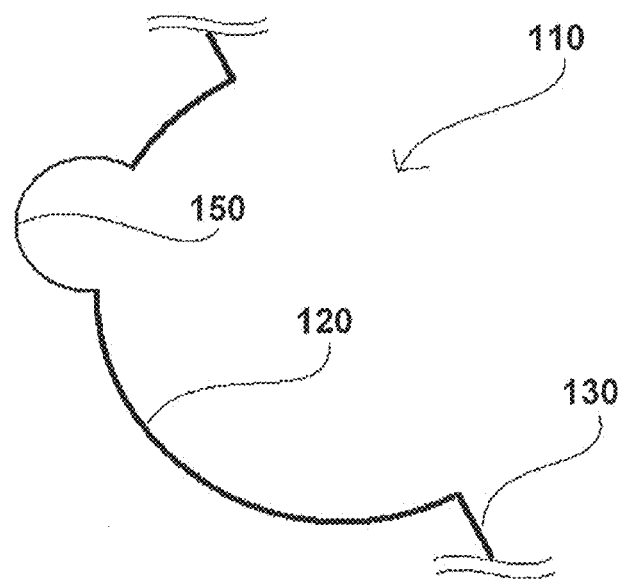
FIG. 2C is an enlarged view of the area B in FIG. 2A illustrating a repair solution in the steeple of the turbine rotor.

Referring to FIGS. 2A and 2B, the steeples 110 include a plurality of grooves 120 and hooks 130, wherein the grooves 120 are formed as recesses in the steeples 110 and the hooks 130 are the portions of the steeples 110 which are not recessed. As discussed above, the turbine rotor 100 is prone to fatigue cracking, e.g., from corrosion and fatigue. A crack 140 is illustrated in an area "B" of FIG. 2A and a magnified view of area B is shown in FIG. 2B. In order to prevent the fatigue crack from expanding and further damaging the turbine rotor 100, a repair solution is required. The repair solution may be performed by removing material from around the crack 140, thereby expanding the groove 120 as shown in FIG. 2C. An exemplary embodiment of a method of removing the material from around the crack 140 is referred to as broaching.

Broaching is a machining process in which a broach is moved across a work piece including the material to be removed; e.g., in the present exemplary embodiment, the work piece is a steeple 110 of the turbine rotor 100. In the present exemplary embodiment, the broach has a series of teeth (not shown), each slightly higher than the series ahead of it. Also in the present exemplary embodiment, the broach has relief spaces disposed between the teeth to promote effective chip removal. Exemplary embodiments also include configurations wherein a suitable cutting fluid is used during the broaching process to facilitate cutting action of the broach, to cool the broach and to extend the tool life of the broach.

In one exemplary embodiment, referring to FIG. 2C, the broach is guided through the work piece in a smooth motion so that the teeth may remove material from the work piece. The area from which the material is removed is called a relief radius 150. In such an exemplary embodiment, the broach may be moved in a single motion through the work piece.

An exemplary embodiment of an apparatus according to the present invention includes a straight or curved broach, the cross section of which is based on the steeple 110 geometry, and moves the broach through the slot 115 between adjacent steeples 110 to remove material from around a crack 140. For ease of description, an exemplary embodiment of an apparatus including a straight broach in accordance with the present invention is described first with respect to FIGS. 3A and 3B. Although the present exemplary embodiments are described with respect to angled and curved broaches, the present invention is not limited thereto and may be applied to applications including various other types of broaches.

Figure 3A:
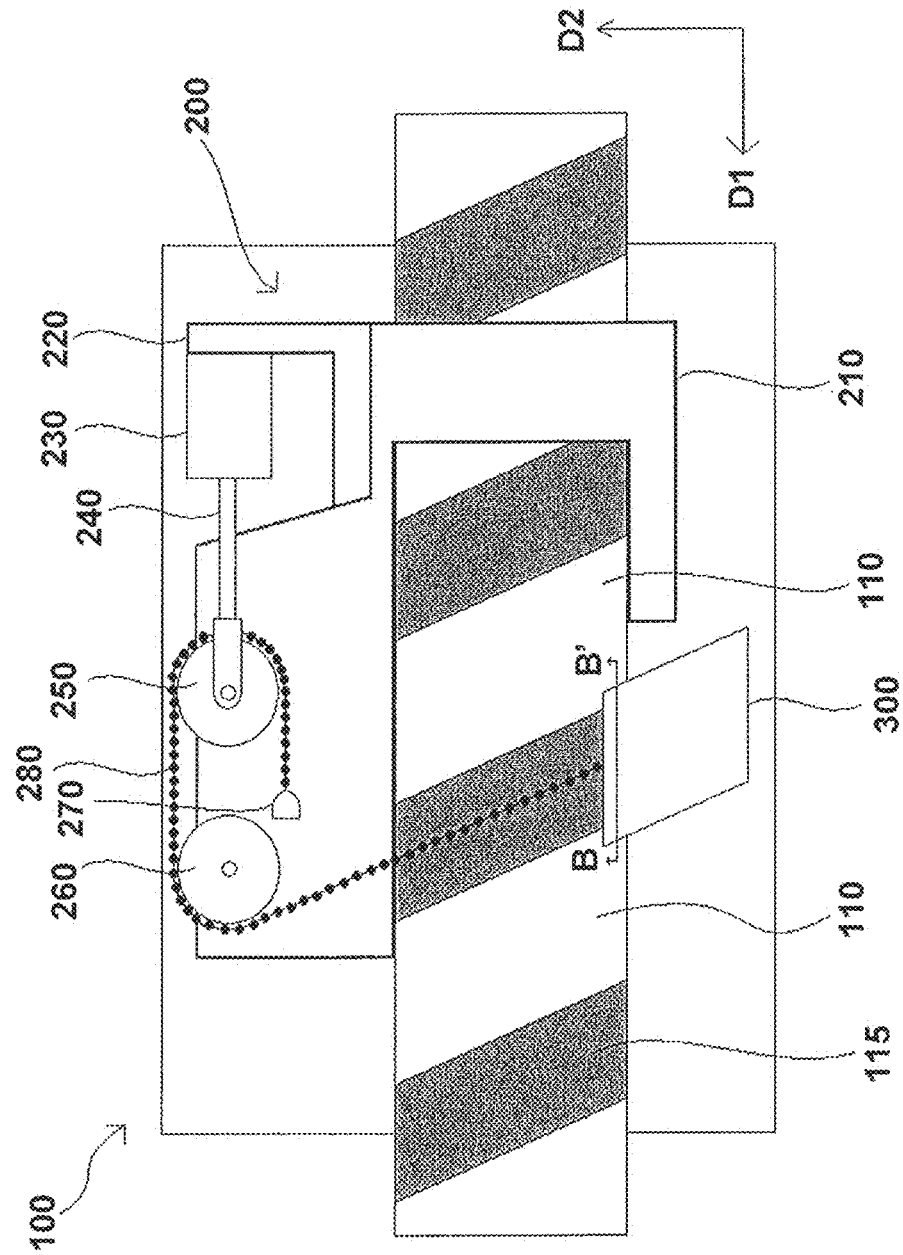
FIG. 3A is a block diagram illustrating an edge-on view of a turbine rotor having angled steeples and a broaching mechanism for repairing straight and/or angled steeples according to an exemplary embodiment of the present invention.
Figure 3B:
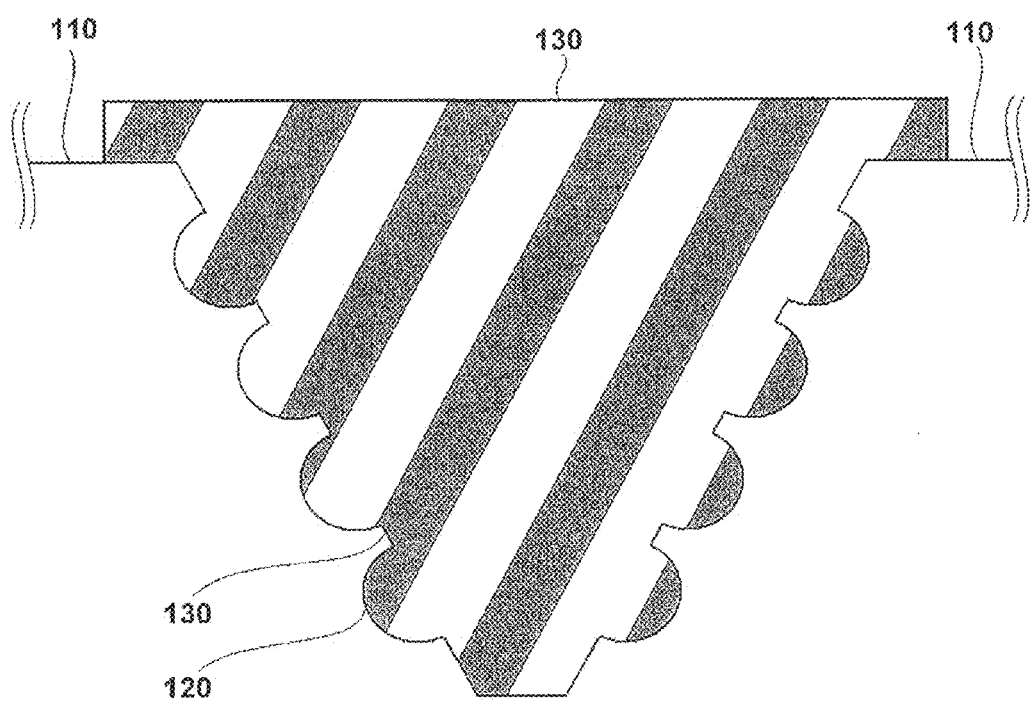
FIG. 3B is a partial cross-sectional view of the angled steeples and exemplary embodiment of a broach taken along lines B-B' of FIG. 3A.

FIG. 3A is a block diagram illustrating an edge-on view of a turbine rotor 100 having angled steeples 110 and an exemplary embodiment of a broaching apparatus for repairing straight and/or angled steeples 110 according to an exemplary embodiment of the present invention and FIG. 3B is a partial cross-sectional view of the angled steeples 110 and exemplary embodiment of a broach taken along line B-B' of FIG. 3A.

Referring to FIG. 3A, an exemplary embodiment of a broaching apparatus 200 according to the present invention includes a fixture assembly 210 located on opposite sides of the steeple 110 to be broached. The fixture assembly 210 may be secured to the turbine rotor 100 by mechanical means, exemplary embodiments of which include pins, clamps or other mechanical means as would be apparent to one of ordinary skill in the art. Alternative exemplary embodiments include configurations wherein the fixture assembly 210 itself provides clamping means for securing the apparatus 200 to the turbine rotor 100 without the use of additional fasteners.

The apparatus 200 includes an actuator frame 220 attached to the fixture assembly 210. The actuator frame 220 anchors a first end of an actuator 230. The actuator 230 has an arm 240 having a first end coupled to a first pulley 250 and a second end disposed substantially opposite to the first end and inserted into the actuator 230, which is anchored to the actuator frame 220. The actuator 230 may extend or retract the arm 240 relative to the actuator 230 anchored to the actuator frame 220. Exemplary embodiments of the actuator 230 may include hydraulic actuators and pneumatic actuators.

The apparatus 200 also includes a second pulley 260 disposed on one of the fixture assembly 210 and the actuator frame 220. As illustrated in FIG. 3A, the second pulley 260 is attached to the fixture assembly 210 and disposed in line with the actuator 230 and the first pulley 250 along a first direction D1. The apparatus 200 also includes a chain anchor 270 disposed on one of the fixture assembly 210 and the actuator frame 220. In the present exemplary embodiment, the chain anchor 270 is attached to the fixture assembly 210 and disposed slightly below the actuator 230 and the first pulley 250 along a second direction D2, which is substantially perpendicular to the first direction D1.

The apparatus 200 includes a chain 280 anchored at a first end by the chain anchor 270. The chain 280 extends behind the first pulley 250 along the first direction D1 before passing over the second pulley 260 and eventually connecting at its second end to a broach 300. Although the present exemplary embodiment describes the apparatus 200 as using a chain 280, other linkage mechanisms could also be used, such as rope, a belt, etc. As used herein, the term "chain" will refer to any flexible mechanical linkage system.

As shown in FIGS. 1 and 3B, the broach 300 has a cross-section based on the steeple geometry so that, once inserted into the slot 115 between adjacent steeples 110, it is constrained between them by its configuration and cannot be removed from a direction substantially perpendicular to a direction of extension of the grooves 120. Once inserted into the slot 115, the broach 300 may only be removed from a direction substantially parallel to a direction of its insertion. In the exemplary embodiment wherein the steeples 110 are fir-tree shaped, the broach 300 may have a substantially inverse-shape filling the entire slot 115. Alternative exemplary embodiments include configurations wherein the broach 300 does not entirely fill the slot 115, e.g., the broach 300 may instead only extend only between a single pair of opposed grooves 120, leaving the rest of the slot 115 above and below the pair of opposed grooves 120 empty. Such an alternative exemplary embodiment reduces friction between the broach 300 and the steeples 110. In addition, alternative exemplary embodiments include configurations wherein the broach 300 does not extend to fully fill the grooves 120 as shown in FIG. 3B, but instead includes only enough material in the groove 120 to ensure the broach 300 may not be removed in a direction substantially perpendicular to the extension of the grooves 120.

Cutting teeth (not shown) disposed on the broach 300 are shaped to form a relief radius 150 in the groove 120 of the steeple 110 at the location of the cracks 140. In one exemplary embodiment, the depth of the relief radius 150 is sufficient to fully remove the material from around the crack 140. In one exemplary embodiment, the broach 300 includes a portion at the beginning thereof with no teeth, to provide a lead-in feature and to stabilize and guide the broach 300 through the area between adjacent steeples 110. The material around the crack 140 is removed by the cutting action of the broach 300 as discussed below. Essentially, the cutting teeth of the broach 300 each remove small amounts of the material around the crack 140 and that material is carried away by the spaces between the teeth.

Referring now to FIGS. 1, 3A and 3B, the broach 300 is pulled through the slot 115 between adjacent steeples 110 in the turbine rotor 100 by the action of the actuator 230. The broaching operation begins with the actuator arm 240 extended from the actuator 230. This configuration provides slack to the chain 280 wrapped around the pulleys 250 and 260 and connected to the broach 300. The broach 300 is inserted into the slot 115 between the adjacent steeples 110 which require repair.

In the exemplary embodiment wherein the broach 300 includes a portion with no teeth, that portion is inserted into the slot 115 first. In other exemplary embodiments, the portion of the broach 300 with the smallest teeth is inserted into the slot 115 first.

Next, the actuator 230 withdraws the arm 240, thereby pulling the chain 280 towards the actuator frame 220. Due to the arrangement of the first and second pulleys 250 and 260 and the chain anchor 270 in the present exemplary embodiment, the chain displacement along the D1 direction is approximately twice the length of the stroke of the actuator 230. The chain displacement may be modified as would be apparent to one of ordinary skill in the art; e.g., alternative exemplary embodiments may include additional pulleys to further increase the chain displacement and alternative exemplary embodiments also may omit the first pulley 250 and instead relocate the chain anchor 270 to the end of the actuator arm 240 in order to decrease chain displacement.

The chain 280 is attached to the broach 300, and therefore the broach 300 is pulled through the area between the adjacent steeples 110. The broach 300 removes material from around cracks 140 in the steeple 110 as has been described in detail above.

In one exemplary embodiment, broaches of increasing relief radius depth may be sequentially employed to remove a greater depth of material from the grooves 120 in discrete cutting depth intervals. In one exemplary embodiment, multiple broaches (not shown) may be sequentially attached to the chain 280 and passed through the slot 115 between adjacent steeples 110, each broach 300 increasing in size by about 0.5 mm increments, with a total maximum depth of about 3.0 mm. Thereby, a larger relief radius may be removed than with a single broach 300.

When the relief radius repair is completed on one area between adjacent steeples, the broaching apparatus may be unclamped, clocked over to the next steeple, and the process repeated. This sequence continues until all the steeples on the rotor that require maintenance are relieved of crack defects.

In one exemplary embodiment, the entire apparatus 200 may be configured to be disposed within a small area. In such an exemplary embodiment, the apparatus 200 may be configured so that it extends in the first direction only to an edge of the turbine rotor 100 along the first direction D1, and so that it extends in the second direction only as far as the edge of the turbine rotor 100 along the second direction D2. This configuration may allow for in situ repair of the turbine rotor 100 without the expense and time of transporting the turbine rotor 100 to repair facilities.

Figure 4:
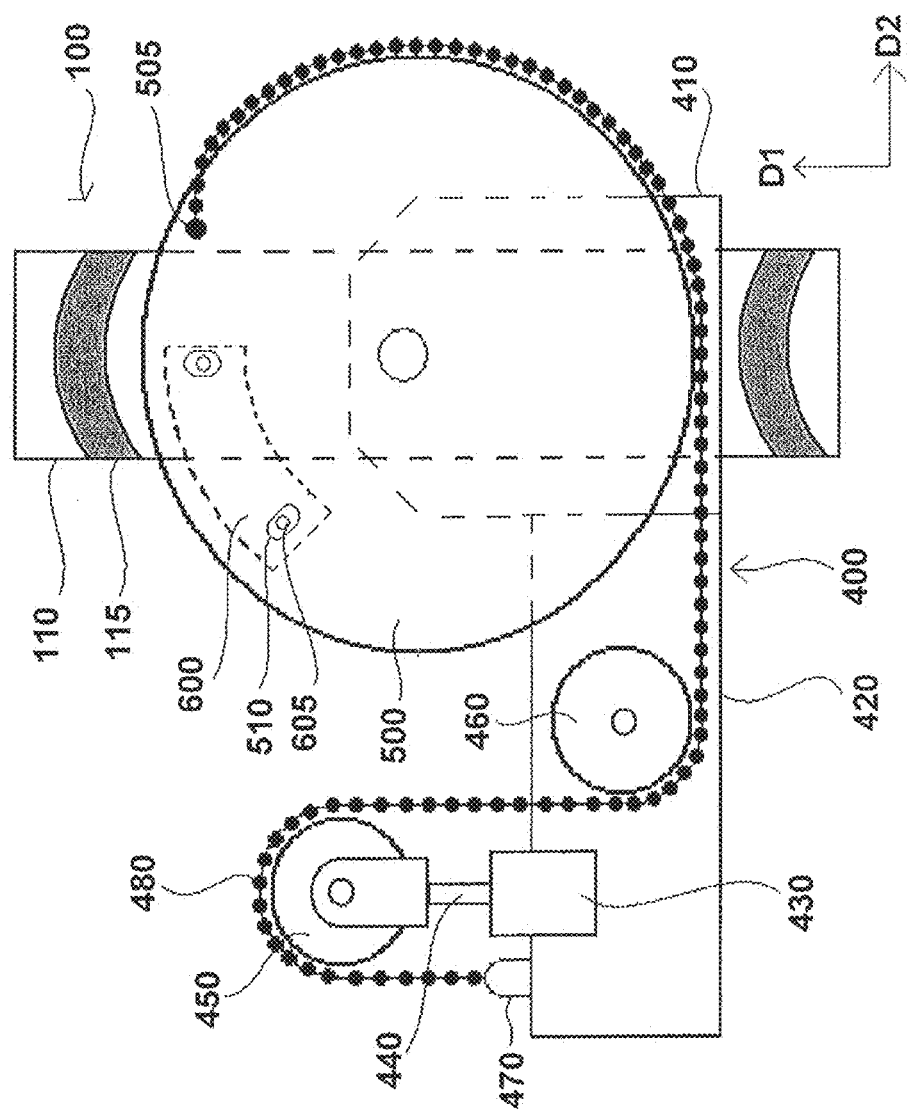
FIG. 4 is a block diagram illustrating an edge-on view of a turbine rotor having curved steeples and broaching mechanism for repairing curved steeples according to an exemplary embodiment of the present invention.

Next, an exemplary embodiment of an apparatus including a curved broach in accordance with the present invention is described first with respect to FIG. 4.

As shown in FIG. 4, similar to the previous exemplary embodiment, an exemplary embodiment of a broaching apparatus 400 according to the present invention includes a fixture assembly 410 located on opposite sides of the steeple 110 to be broached. The fixture assembly 410 may be secured to the turbine rotor 100 by mechanical means, exemplary embodiments of which include pins, clamps or other mechanical means as would be apparent to one of ordinary skill in the art. Alternative exemplary embodiments include configurations wherein the fixture assembly 410 itself provides means for securing the apparatus 400 to the turbine rotor 100 without the need for additional fasteners.

The apparatus 400 includes an actuator frame 420 attached to the fixture assembly 410 along the second direction D2. The actuator frame 420 anchors a first end of an actuator 430. The actuator 430 has an arm 440 coupled to a first pulley 450 on a second end disposed substantially opposite to the end anchored to the actuator frame 420. The actuator 430 may extend or retract the arm 440 with respect thereto along the first direction D1, substantially perpendicular to the second direction D2.

The apparatus 400 also includes a second pulley 460 disposed on one of the fixture assembly 410 and the actuator frame 420. As illustrated in FIG. 4, the second pulley 460 is attached to the actuator frame 420 and disposed below the actuator 430 and the first pulley 450 along the first direction D1. The apparatus 400 also includes a chain anchor 470 disposed on the actuator frame 420 on the opposite side of the actuator 430 from the second pulley 460. As illustrated in FIG. 4, the chain anchor 470 is attached to the actuator frame 420 and disposed slightly above the second pulley 460 along the first direction D1.

The apparatus 400 includes a chain 480 anchored at one end by the chain anchor 470 and runs above the first pulley 450 along the first direction D1 before passing under the second pulley 460 and eventually connecting at its second end to an actuator disk 500.

The actuator disk 500 may be rotatably connected to the fixture assembly 410 or the actuator frame 420. In the present exemplary embodiment, a center of the actuator disk 500 is disposed on the fixture assembly 410 so that it is disposed along a centerline of the turbine rotor 100. After passing under the second pulley 460, the chain wraps around an outer edge of the actuator disk 500 and connects to a pin 505 on the actuator disk 500. Although the present exemplary embodiment discloses a pin 505 as a means for connecting the chain 480 to the actuator disk, other means for securing the chain 480 to the disk 500 may also be used. A curved broach 600 is disposed on the underside of the actuator disk 500.

Unlike the previous exemplary embodiment, the broach 600 of the present exemplary embodiment is curved in order to conform to the cross-section of the curved slot 115 between the adjacent steeples 110 in the turbine rotor 100. Two race-track shaped slots 510 in the actuator disk 500 are engaged by shoulder pins 605 protruding from the broach 600. The shoulder pin 605 to slot 510 contact provides reaction forces to the slots 510, which are disposed substantially parallel to a radius of the actuator disk 500. This configuration provides advantages to the operation of the apparatus 400 as will be discussed in more detail below.

Similar to the previous exemplary embodiment, the broach 600 has a cross-section based on the steeple geometry so that, once inserted, it is constrained in the slot 115 between the adjacent steeples 110 by its configuration and can not be removed from a direction substantially perpendicular to a direction of extension of the grooves 120. Once inserted into the slot 115 between the adjacent steeples 110, the broach 300 may only be removed from a direction similar to the shape of the arc of the curved area between the steeples 110. Similar to the previous exemplary embodiment, in the present exemplary embodiment if the steeples 110 are fir-tree shaped, the broach 300 may have a substantially inverse shape filling the slot 115 between the adjacent steeples 110, or may have other cross-sectional shapes as described above.

Similar to the previous exemplary embodiment, the cutting teeth (not shown) of the broach 600 are shaped to form a relief radius 150 in the groove 120 of the steeple 110 at the location of the cracks 140. In one exemplary embodiment, the depth of the relief radius 150 is sufficient to fully remove the material from around the crack 140. In one exemplary embodiment, the broach 600 includes a portion at the beginning thereof with no teeth, to provide a lead-in feature and to stabilize and guide the broach 600 through the area between adjacent steeples 110. The crack 140 is removed by the cutting action of the broach 600 as discussed below. Essentially, the cutting teeth of the broach 600 each remove small amounts of the material around the crack 140 and that material is carried away by the spaces between the teeth.

In operation, the broach 600 is pulled through the slot 115 between adjacent steeples 110 in the turbine rotor 100 by the action of the actuator 430. The broaching operation begins with the actuator arm 440 retracted into the actuator 430. This configuration provides slack to the chain 480 wrapped around the pulleys 450 and 460 and connected to the actuator disk 500. The actuator disk 500 is positioned so the broach 600 may be inserted into the slot 115 between the adjacent steeples 110 which require repair. In the exemplary embodiment wherein the broach 600 includes a portion with no teeth, that portion is inserted into the slot 115 first. In other exemplary embodiments, the portion of the broach 600 with the smallest teeth is inserted into the slot 115 first.

Next, the actuator 430 extends the arm 440, thereby pulling the chain 480 away from the actuator frame 420. Due to the arrangement of the first and second pulleys 450 and 460, the chain anchor 470 and the actuator disk 500 in the present exemplary embodiment, the displacement of the actuator disk 500 due to the motion of the actuator 430 is approximately 200 degrees of angular displacement. The angular displacement of the actuator disk 500 may be modified as would be apparent to one of ordinary skill in the art; e.g., alternative exemplary embodiments may include additional pulleys to further increase the angular displacement and other alternative exemplary embodiments may omit the second pulley 460 in order to decrease angular displacement.

The chain 480 exerts a torque on the actuator disk 500, thereby generating a smooth, circumferential motion, driving the curved broach 600 through the slot 115 between adjacent steeples 110 in the turbine rotor 100. As mentioned above, the shoulder pin 605 to racetrack slot 510 contact provides reaction forces from the racetrack slots 510 to the shoulder pins 605 and the racetrack slots 510 are disposed substantially parallel to the radius of the actuator disk 500. This configuration minimizes broach cocking or jamming in the slot 115 between adjacent steeples 110. The racetrack slots 510 transmit the force necessary to push the curved broach 600 through the slot 115 between steeples 110 while allowing for some initial misalignment or out-of-plane placement of the actuator disk 500.

Similar to the previous exemplary embodiment, in one exemplary embodiment, broaches of increasing relief radius depth may be sequentially employed to remove a greater depth of material from the grooves 120 in discrete cutting depth intervals. In one exemplary embodiment, multiple broaches (not shown) may be sequentially connected to the actuator disk 500 and passed through the slot 115 between adjacent steeples 110, each broach 500 increasing in size by about 0.5 mm increments, with a total maximum depth of about 3.0 mm. Thereby, a larger relief radius may be removed than with a single broach 500.

When the radius relief repair is completed on one area between steeples 110, the broaching apparatus 400 may be unclamped, clocked over to the next slot between adjacent steeples, and the process repeated. This sequence continues until all the steeples on the rotor that require maintenance are relieved of crack defects.

The primary benefit from the field-deployable broaching machine is the creation of a crack removal system, with a significant productivity advantage over currently available methods. Use of an exemplary embodiment of a broaching apparatus according to the present invention enables shorter outages, substantial cost savings, and higher unit availability. There is also the benefit of superior quality control, and greater uniformity of the repair process when compared to a manual grinding method.

The above exemplary embodiments of the invention describe a broaching tool whose design leverages the existing geometric configuration of the slot between adjacent steeples in a turbine rotor to accurately guide the broach through its path. The steeple hooks and grooves provide ample bearing-area to resist the tooling forces from the broach cutting action. The curved broach can remove cracks from all hooks on a given steeple with one brief cycling of the device, as opposed to removing each crack one at a time as done in hand grinding. The actuator, chain and actuator disk configuration is simple and rugged.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for repairing a crack in a turbine rotor, the method comprising:
   securing a fixture assembly to the turbine rotor;
   coupling an actuator frame to the fixture assembly;
   coupling an actuator to the actuator frame;
   coupling a first pulley to an end of the actuator opposite the actuator frame;
   disposing a chain anchor on one of the fixture assembly and the actuator frame;
   coupling a first end of a chain to the chain anchor, a middle section of the chain passing through the first pulley; and
   coupling a second end of the chain to a broach, the broach having a cross-section corresponding to a geometry of a slot between two adjacent steeples in a direction of extension of the slot; and
   removing material surrounding the crack by moving the broach through the slot in a direction substantially parallel to a direction of extension of the slot wherein a motion of the actuator is transferred to the broach via the chain.

2. The method of claim 1, wherein the broach is disposed on a disk and is pulled through the slot by a motion of the actuator, in a curved path.

\* \* \* \* \*